(12) United States Patent
Nelson

(10) Patent No.: US 10,663,177 B2
(45) Date of Patent: May 26, 2020

(54) EXTENDING RACK FOR A COOKING APPLIANCE

(71) Applicant: Midea Group Co., Ltd., Beijiao, Shunde, Foshan (CN)

(72) Inventor: Nathan E. Nelson, Louisville, KY (US)

(73) Assignee: MIDEA GROUP CO., LTD., Beijiao, Shunde, Foshan, Guangdong (CN)

(*) Notice: Subject to any disclaimer, the term of this patent is extended or adjusted under 35 U.S.C. 154(b) by 173 days.

(21) Appl. No.: 16/117,818

(22) Filed: Aug. 30, 2018

(65) Prior Publication Data

US 2020/0072474 A1 Mar. 5, 2020

(51) Int. Cl.
| | |
|---|---|
| *F24C 15/16* | (2006.01) |
| *F16C 29/02* | (2006.01) |
| *A47B 88/483* | (2017.01) |
| *A47B 55/02* | (2006.01) |

(52) U.S. Cl.
CPC ............ *F24C 15/16* (2013.01); *A47B 88/483* (2017.01); *F16C 29/02* (2013.01); *A47B 55/02* (2013.01)

(58) Field of Classification Search
CPC ....... F24C 15/16; A47B 88/483; A47B 55/02; F16C 29/02
See application file for complete search history.

(56) References Cited

U.S. PATENT DOCUMENTS

| | | | |
|---|---|---|---|
| 3,291,113 A | 12/1966 | Scott | |
| 5,507,398 A | 4/1996 | Miller | |
| 5,988,158 A | 11/1999 | Schmidt, Jr. | |
| 7,703,453 B2 | 4/2010 | Hughes | |
| 8,047,199 B2 | 11/2011 | Le et al. | |
| 8,602,019 B2 | 12/2013 | Baker et al. | |
| 8,739,773 B2 | 6/2014 | Ambrose et al. | |
| 9,052,118 B2 | 6/2015 | Metcalf et al. | |
| 9,291,199 B2 | 3/2016 | Foster et al. | |
| 9,587,838 B2 | 3/2017 | Stewart et al. | |
| 9,599,349 B2 | 3/2017 | Gluf | |
| 2006/0065265 A1 | 3/2006 | Erdmann et al. | |

FOREIGN PATENT DOCUMENTS

| | | |
|---|---|---|
| CN | 103651646 A | 3/2014 |
| CN | 104433844 A | 3/2015 |
| CN | 104665620 A | 6/2015 |
| CN | 206851883 U | 1/2018 |
| EP | 1748257 A2 | 1/2007 |
| WO | 17097325 A1 | 6/2017 |

OTHER PUBLICATIONS

Bosch. "Gliding Telescoping Rack for Most 30" Bosch Wall Ovens and Slide-In Ranges." www.bestbuy.com. Retrieved on Jul. 11, 2018.
KitchenAid. "KitchenAid 30" Heavy Duty Sliding Rack." www.abt.com. Retrieved on Jul. 11, 2018.
Wolf. "36" Full-Extension Ball-Bearing Oven Rack." www.subzero-wolf.com. Retrieved on Jul. 11, 2018.
International Search Report and Written Opinion issued in Application No. PCT/CN2018/123989 dated May 29, 2019.

*Primary Examiner* — Alfred Basichas
(74) *Attorney, Agent, or Firm* — Middleton Reutlinger

(57) ABSTRACT

An apparatus and method of an extending rack for a cooking appliance. One or more bushings slidingly engage one or more sliding rods allowing a wire rack or structure to travel between positions relative to a remaining portion of the extending rack. One or more support rods may be used with the sliding rods. The extending rack may include one or more retaining clips engaging the one or more bushings to the wire rack.

20 Claims, 6 Drawing Sheets

EXTENDING RACK FOR A COOKING APPLIANCE

BACKGROUND

The present embodiments relate to an extending rack integrated into a cooking appliance, and particularly, but not limited to, for a gas and/or electric cooking appliance.

Typical cooking appliances with oven racks involve a wire oven rack sliding directly on enameled surfaces of the side wall ribs within the oven cavity and/or using a plurality of ball bearing slides for the desired motion. These contacting surfaces may create undesired friction and inadvertently decrease the user's perception of the rack's motion. Further, the plurality of ball bearing slide components may increase cost related to materials and assembly. Thus, there is a need to allow, but is not limited to, an apparatus and method to conveniently deploy and/or stow the extending rack, increase the smoothness and operating motion of the rack, and/or reduce the friction between running surfaces.

SUMMARY

In some embodiments, an extending oven rack for a cooking appliance may comprise a rack framework adapted to engage one or more interior side walls of a cooking appliance. In various embodiments, the extending oven rack may include one or more cylindrical sliding rods coupled to the rack framework extending in a longitudinal direction of travel of the extending rack. Moreover, in some embodiments, the one or more cylindrical sliding rods may include an outer cylindrical surface. In some embodiments, the extending oven rack may include a wire rack having one or more cylindrical bushings slidingly engaging the one more cylindrical sliding rods in order to position the wire rack forwards and backwards along the longitudinal direction of travel relative to the rack framework. In addition, in various embodiments, the one or more cylindrical bushings may include an outer cylindrical surface and an inner cylindrical surface. In various embodiments, the inner cylindrical surface of the one or more cylindrical bushings may slidingly engage the outer cylindrical surface of the one or more cylindrical sliding rods.

In addition, in some embodiments, at least two cylindrical bushings of the one or more cylindrical bushings slidingly engage a single cylindrical sliding rod of the one or more cylindrical sliding rods. In various embodiments, the extending oven rack may include one or more retaining clips securing the one or more cylindrical bushings to the wire rack. In some embodiments, the extending oven rack may comprise a pin and slot engagement between the one or more retaining clips and the one or more bushings. In some embodiments, the one or more cylindrical bushings further include one or more longitudinally extending slots. In various embodiments, the one or more longitudinally extending slots may include a bottom and opposing sides extending from the bottom to the outer cylindrical surface of the one or more cylindrical bushings. In some embodiments, the inner cylindrical surface of the one or more cylindrical bushings may define the bottom of the one or more longitudinal slots. In addition, in some embodiments, a single cylindrical bushing of the one or more cylindrical bushings may slidingly engage a single cylindrical sliding rod of the one or more cylindrical sliding rods. In various embodiments, the rack framework may include one or more support rods extending in the longitudinal direction of travel. In some embodiments, the one or more support rods may be adjacent to the one or more sliding rods.

In some embodiments, an extending oven rack for a cooking appliance may comprise an oven cavity having one or more interior side walls. In various embodiments, the extending oven rack may include a rack framework adapted to engage one or more interior side walls. In addition, in some embodiments, the rack framework may include a rectangular shaped wire grid and one or more support rods adjacent to one or more cylindrical sliding rods. In various embodiments, both the one or more support rods and the one or more cylindrical sliding rods may extend in a longitudinal direction of travel of the extending oven rack. In some embodiments, the one or more cylindrical sliding rods may include an outer cylindrical surface. Moreover, in various embodiments, the extending oven rack may comprise a wire rack having one or more cylindrical bushings slidingly engaging the one more cylindrical sliding rods in order to position the wire rack forwards and backwards along the longitudinal direction of travel relative to the rack framework. In various embodiments, the one or more cylindrical bushings may include an outer cylindrical surface and an inner cylindrical surface. In some embodiments, the inner cylindrical surface of the one or more cylindrical bushings may slidingly engage the outer cylindrical surface of the one or more cylindrical sliding rods.

In addition, in some embodiments, the one or more cylindrical bushings may include a first bushing and a second bushing. In various embodiments, at least one of the first bushing and the second bushing may engage a single cylindrical sliding rod of the one or more cylindrical sliding rods. In some embodiments, each one of the first bushing and the second bushing may include a longitudinally extending slot receiving the one or more cylindrical sliding rods. Moreover, in various embodiments, the longitudinally extending slot of the first bushing may be circumferentially unaligned with the longitudinally extending slot of the second bushing. In some embodiments, the extending oven rack may comprise one or more retaining clips. In some embodiments, the retaining clip may engage the wire rack to at least one of the first bushing and the second bushing. In various embodiments, opposing ends of the one or more cylindrical sliding rods may be secured to corresponding opposing ends of the one or more support rods. Moreover, in various embodiments, the one or more sliding rods may be positioned above the one or more support rods in a substantially vertical plane.

Further, in some embodiments, an extending oven rack used in a cooking appliance may comprise a rack framework including a rectangular shaped wire grid and a support rod adjacent to a cylindrical sliding rod. Moreover, in various embodiments, both the support rods and the cylindrical sliding rod may extend in a longitudinal direction of travel of the extending oven rack. In some embodiments, the cylindrical sliding rod may include an outer cylindrical surface. In various embodiments, the extending oven rack may include a wire rack having one or more retaining clips positioning a first cylindrical bushing. In some embodiments, the first cylindrical bushing may slidingly engage the cylindrical sliding rod in order to position the wire rack forwards and backwards along the longitudinal direction of travel relative to the rack framework. In some embodiments, the first cylindrical bushing may include an outer cylindrical surface and an inner cylindrical surface. In various embodiments, the inner cylindrical surface of the first cylindrical bushing may slidingly engage the outer cylindrical surface of the cylindrical sliding rod.

In addition, in some embodiments, the extending oven rack may include a second cylindrical bushing slidingly engaging the cylindrical sliding rod. In various embodiments, the second cylindrical bushing and the first cylindrical bushing are axially aligned. In various embodiments, the first cylindrical bushing may include a longitudinal slot within the outer cylindrical surface of the first cylindrical bushing. Moreover, in some embodiments, the first cylindrical bushing and the cylindrical sliding rod may be spaced inwardly from a lateral edge of the rack framework. In various embodiments, the support rod and the cylindrical sliding rod may be stacked in a vertical plane.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
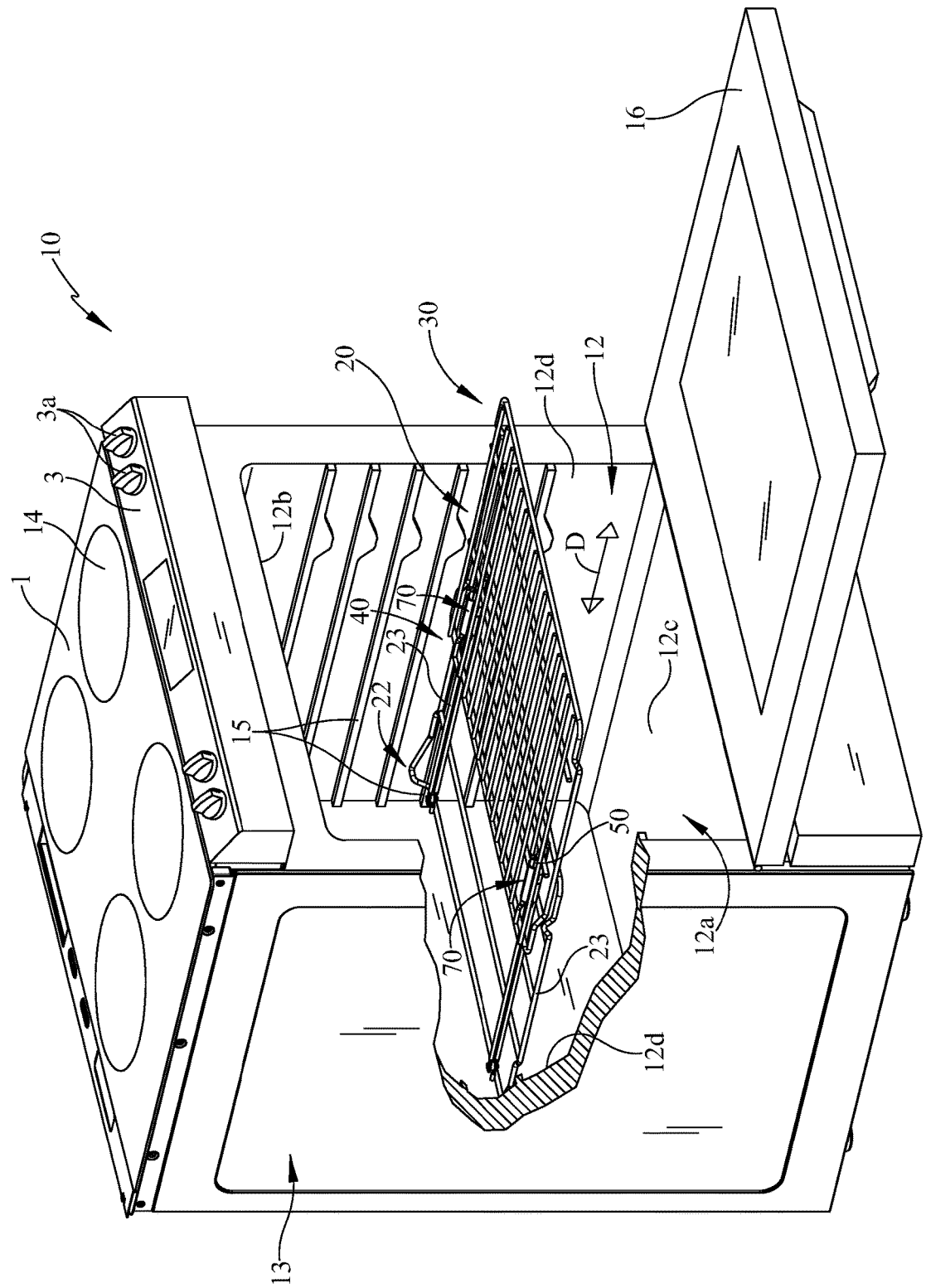
FIG. 1 is a perspective view of one embodiment of an extending rack of a cooking appliance illustrating the extending rack in a forward or deployed position through a front opening of the cooking appliance.
Figure 2:
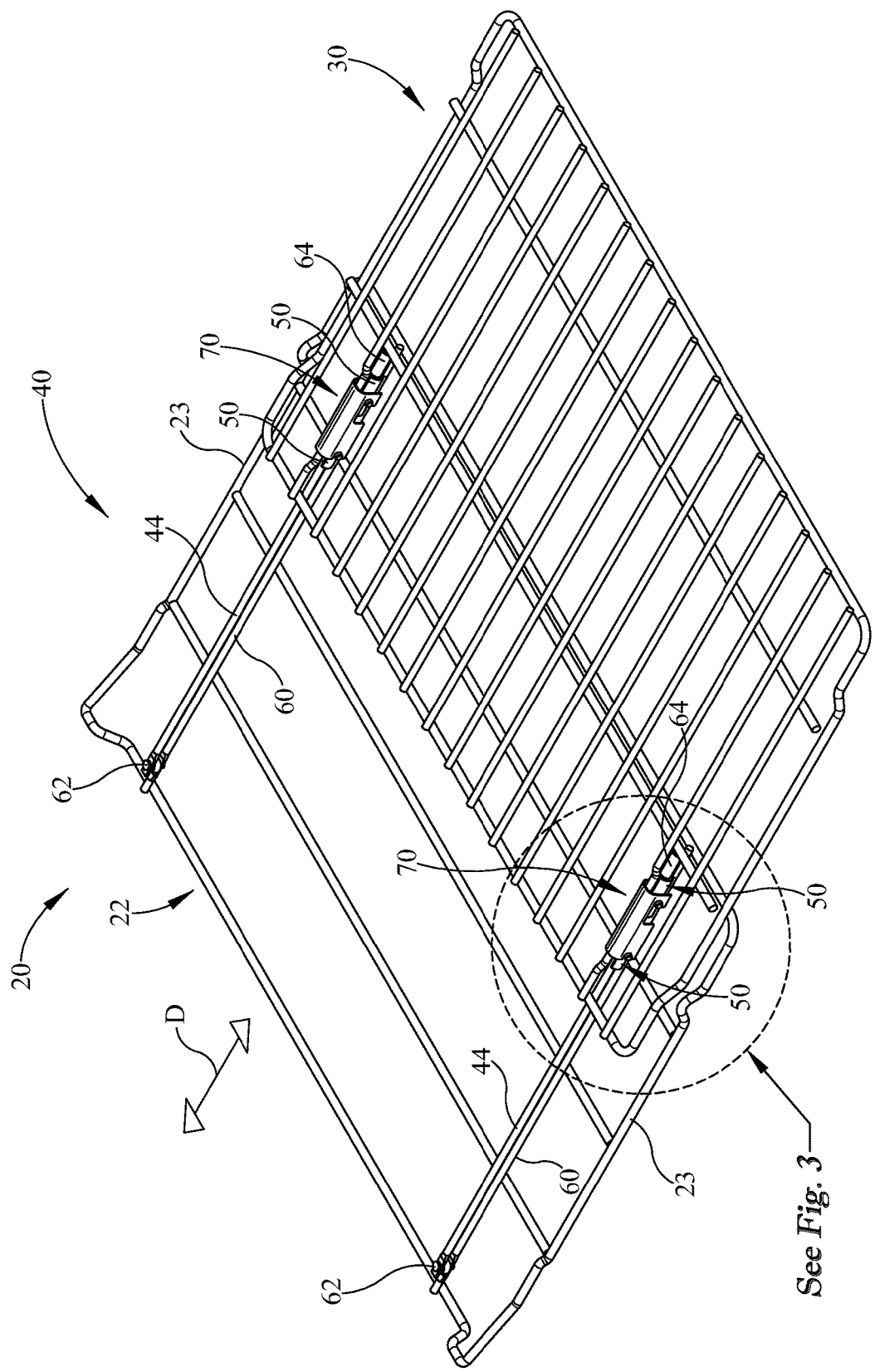
FIG. 2 is a perspective view of the extending rack embodiment of FIG. 1.
Figure 3:
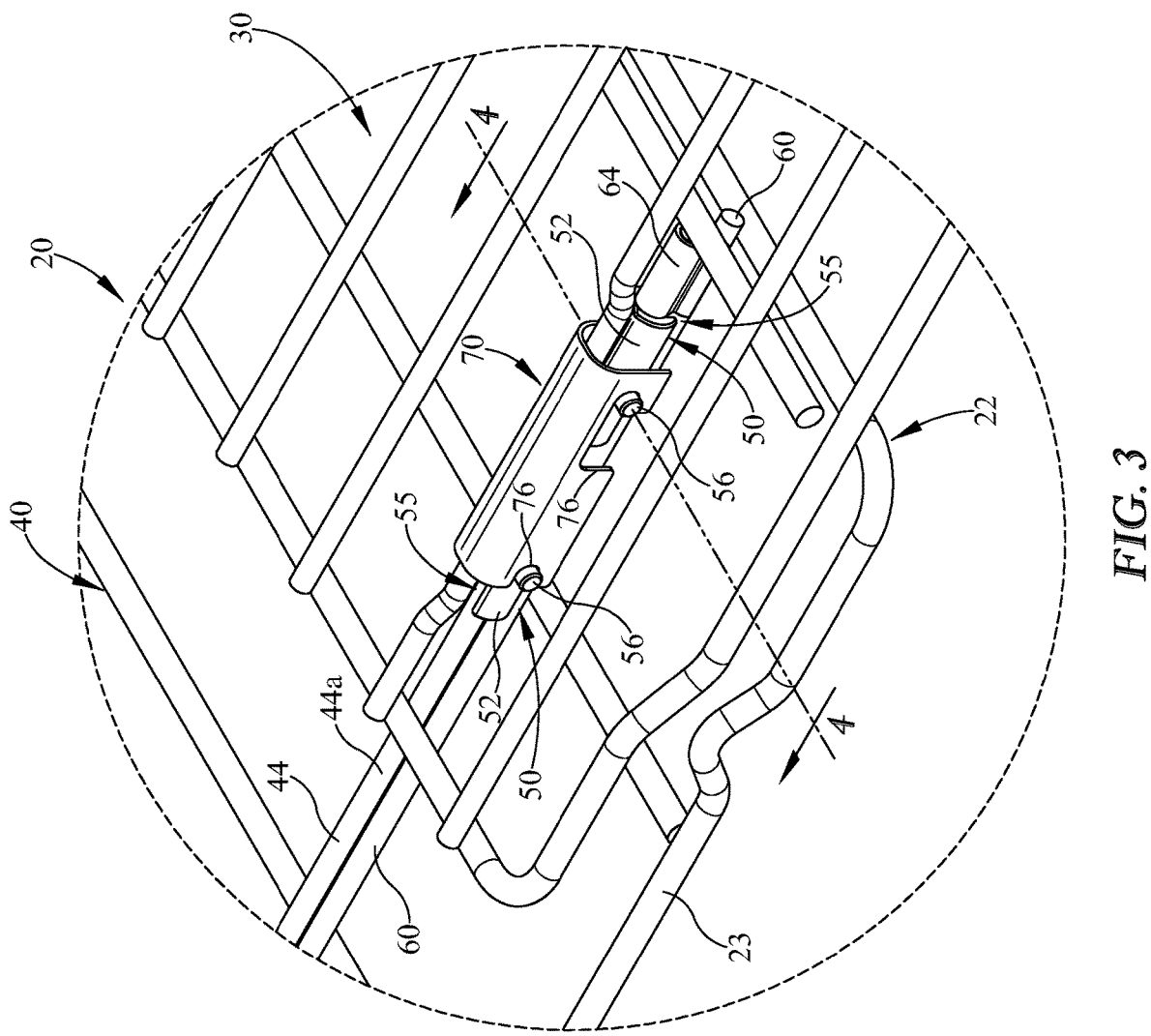
FIG. 3 is an enlarged perspective view of the extending rack embodiment of FIG. 2.

Numerous variations and modifications will be apparent to one of ordinary skill in the art, as will become apparent from the description below. Therefore, the invention is not limited to the specific implementations discussed herein.

As illustrated in the Figures, one or more extending racks 20 may be used in a variety of cooking appliances 10 to extend or retract one or more wire racks 30 relative to the remaining rack framework 40. The extending rack 20 may have an outer periphery 22 engaging one or more sides or ribs 15 of the cooking compartment or cavity 12. A door 16 defines at least a portion of the front opening 12a into the cooking compartment 12. The door 16 is typically on the front side of the appliance 10 and may be positioned above a warming drawer, if used. Although the extending rack 20 is shown as across the entire front opening 12a into the compartment 12, it should be understood that the extending rack 20 may extend across a portion of one or more cooking compartments 12 or opening 12a. Although one extending rack 20 is shown in FIG. 1, a plurality of extending racks may be used.

In some implementations, the cooking appliance 10 may include a cooktop 1 on a top of the housing 13. The cooking appliance 10 may further include a control panel 3 having a plurality of control knobs or controls 3a for controlling the gas and/or electric burners 14, if a range used, and/or cooking compartment 12. The embodiments discussed hereinafter will focus on the implementation of the hereinafter-described techniques and apparatuses within a residential cooking appliance such as cooking appliance 10, such as the type that may be used in single-family or multi-family dwellings, or in other similar applications. It will be appreciated that the herein-described techniques and apparatuses may also be used in connection with other types of cooking appliances in some embodiments. For example, the herein-described techniques may be used in commercial applications in some embodiments. Moreover, the herein-described techniques may be used in connection with various cooking appliance configurations. Implementation of the herein-described techniques within oven burners, broil burner, gas and/or electric range, slide-in oven, freestanding oven, wall oven, gas and/or electric cooktop, gas countertop range, cooking appliances with front or rear controls, etc. using a extending rack would be well within the abilities of one of ordinary skill in the art having the benefit of the instant disclosure, so the embodiments are not limited to the slide-in oven implementation discussed herein. Moreover, the herein-described apparatus and techniques may be used in connection with other appliances, such as, for example, a dishwasher appliance.

As shown in the FIG. 1, the extending rack 20 may be used in a home oven or cooking appliance 10, such as but not limited to a slide-in cooking range, having a housing 13 and the cooking compartment 12, such as a baking oven, convection oven, steam oven, warming drawer and the like, in the housing 13 and accessible through the door 16 in the front of the housing 13. In the cooking appliance 10 shown in FIG. 1, the housing 13 may have a one or more cooking compartments 12 (e.g. single or double oven). It should be understood that the one or more cooking compartments 12 and/or burners 14 may be heated by gas, electric, hybrid of gas and electric, or combination of heat sources thereof. One application of an embodiment of the cooking appliance may be for a general purpose kitchen oven. The extending rack 20 may be adapted to engage the interior of the cooking compartment or portions of the cooking appliance. The cooking compartment 12 and/or opening 12a may also be defined by at least a top 12b, a bottom 12c, and at least two sides 12d interconnecting the top and bottom. Portions of the outer periphery 22 or lateral edges 23 of the extending rack 20 may engage the ribs 15 adjacent the side walls or sides 12c.

In some implementations, the extending rack 20 may include the wire rack or shelf 30 sliding relative to the rack framework 40 by one or more cylindrical bushings 50. However, other structure or constructions of the shelf 30 may slide relative to the rack framework/appliance. The wire rack 30 in some embodiments may slide in a direction D (e.g. longitudinal, linear, angled direction of travel, etc.) transverse to the front opening 12a of the cavity or compartment 12. The wire rack 30 may include one or more cylindrical bushings 50 slidably receiving the rack framework 40 to allow backwards and forwards motion of the wire rack or portions thereof along the direction D. The cylindrical bushings 50 may be fixedly attached to the wire rack 30 and travel with one or more portions of the one or more wire racks 30. For example, in some embodiments, two wire racks 30 may slide relative to the rack framework 40. In various embodiments, wire rack 30 may slide relative to another or fixed wire rack portion stationary with the rack framework. The wire rack 30 and/or rack framework 40 of the extending rack 20 may be a variety of constructions, quantities, sizes, shapes, positions, and still provide motion relative to each other.

Figure 4:
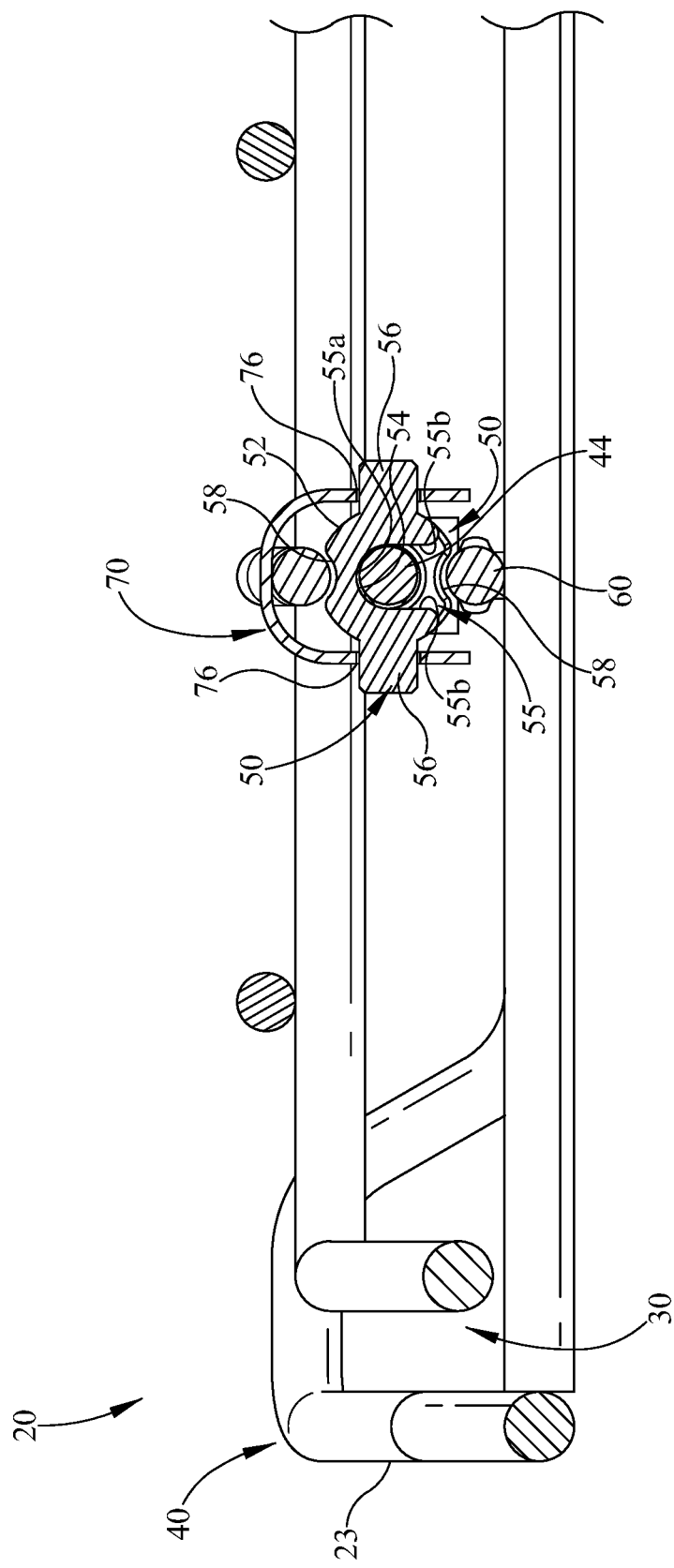
FIG. 4 is a sectional view of the extending rack embodiment of FIG. 3 taken along line 4-4.
Figure 5:
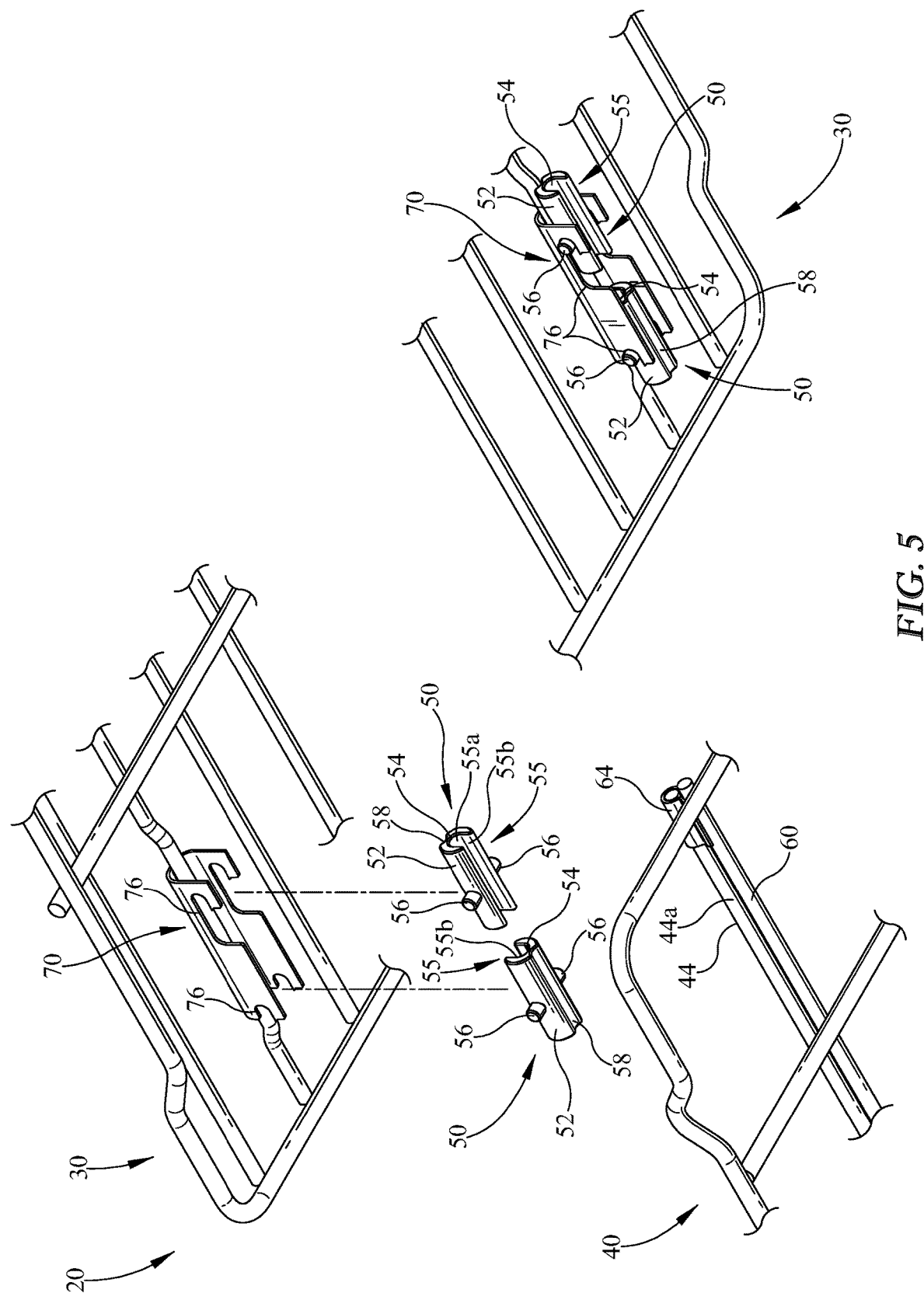
FIG. 5 is an exploded perspective view of the embodiment of FIG. 2 illustrating two bushings exploded away from the retaining clip.
Figure 6:
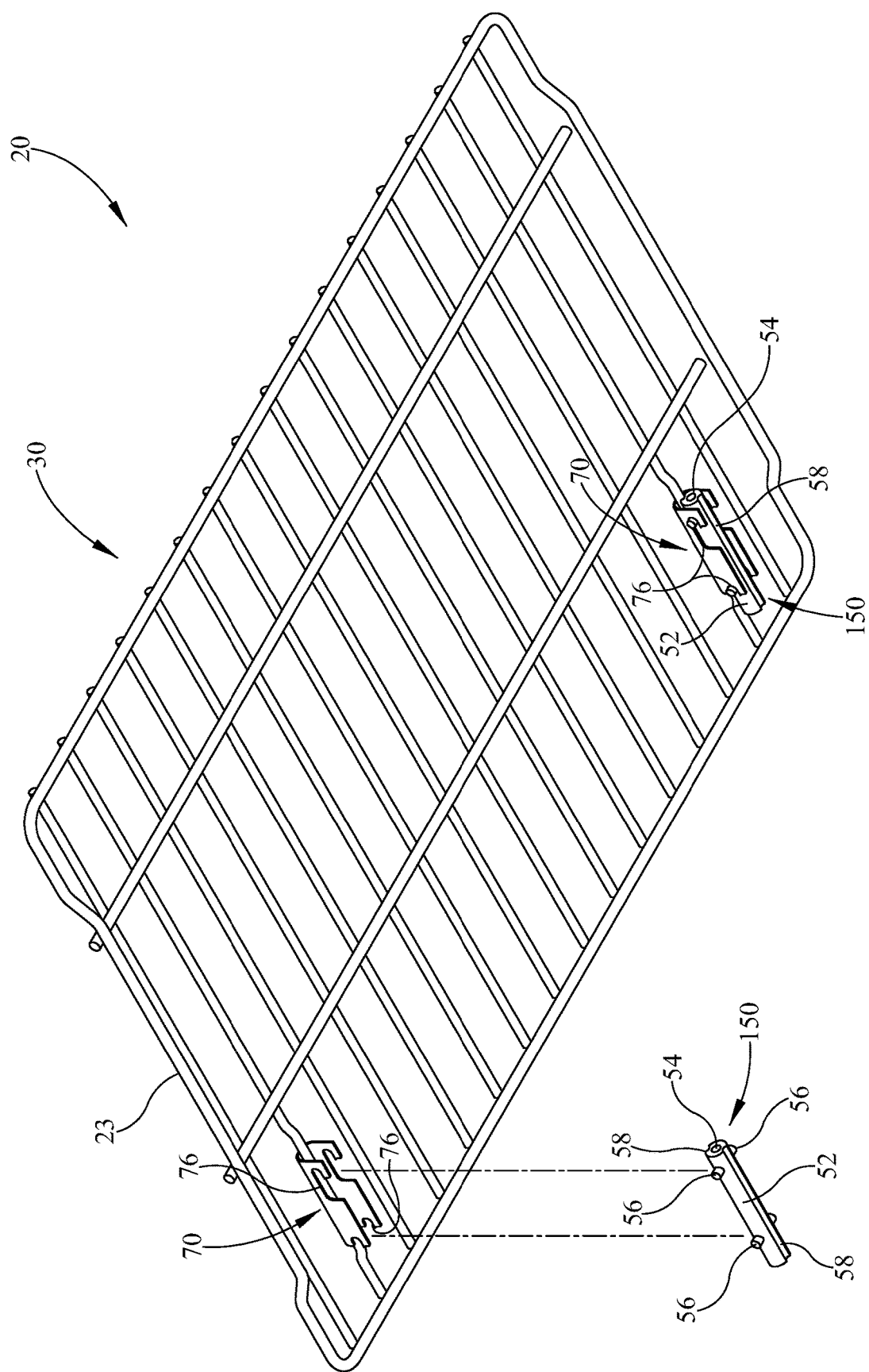
FIG. 6 is an exploded perspective view of another embodiment of an extending rack illustrating a single bushing exploded away from the retaining clip.

In various embodiments, the one or more bushings 50 may be an elongated cylindrical shaped construction. As shown in FIGS. 4 and 5, the bushings 50 may include an outer cylindrical surface 52 and/or an inner cylindrical surface 54. In the embodiment shown, the inner cylindrical surface 54 slidably engages the rack framework 40 (e.g. one or more cylindrical sliding rods 44). The inner and outer surfaces 54, 52 of the bushings 50 may be continuous or discontinuous in some embodiments. As shown in FIGS. 1-5, the inner and/or outer cylindrical surface 54, 52 may be discontinuous about its circumference and/or length. In some embodiments, for example, the cylindrical bushings 50 may include one or more longitudinally extending slots 55. The bushings 50, for example if slotted, may increase for sliding efficiency (e.g. by reducing the effects of thermal expansion and/or reducing issues with component dimensions such as the through bore/inner cylindrical surface straightness). The longitudinal slot 55 may extend from the outer cylindrical surface 52 to the inner cylindrical surface 54 such that a bottom 55a of the slot is defined by the inner cylindrical surface 54. The opposing sides 55b of the slot 55 may extend from the bottom 55a or inner cylindrical surface 54 to the outer cylindrical surface 52. The longitudinally extending slots 55 may radially receive (e.g. outer periphery towards inner periphery) the one or more cylindrical sliding rods 44 in some embodiments. In various embodiments, the slots 55, if used, may be sized that the sliding rods 44 may not be radially inserted into engagement with the bottom 55a and/or inner cylindrical surface 54. For example, the distance between opposing sides 55b of the slot 55 may be smaller than the diameter of the sliding rod 44. In some embodiments, as shown in FIG. 6, the sliding rods 44 may be assembled axially through one or more opposing ends of the cylindrical bushing 150. Although the slots extend from each opposing end of or the full length of the cylindrical bushing, it should be understood that the slots may be a variety of shapes, sizes (e.g. length, width, depths, etc.), quantities, construction, and orientations relative to the wire rack, rack framework, retaining clip, sliding rod, etc. For example, the slots may extend radially outward from the inner cylindrical surface of the bushing to a depth that does not intersect with the outer cylindrical surface. Moreover, for example, the slot may not extend the full length but for one or more portions thereof (e.g. extending from one opposing proximal end for a distance and spaced from the other distal end, disconnected slots from opposing ends of the bushing, slots may not intersect with the ends of the bushing, etc.). Moreover, the slots may be positioned or face towards a variety of orientations about the bushing(s). For example, in the embodiment shown in FIG. 5, the slot 55 orientation of one bushing 50 may be different from the slot 55 orientation of another bushing 50 (e.g. the slots are circumferentially unaligned). As further shown in FIG. 5, the front bushing 50 illustrates one embodiment of the slot 55 opening downwardly and the back bushing 50 illustrates one embodiment of the slot 55 opening upwardly. As shown in FIG. 6, embodiments of the one or more cylindrical bushings 150 may not include one or more slots. The inner and/or outer cylindrical surfaces 54, 52 may be a variety of shapes other than cylindrical and still be within the scope of the invention. In some embodiments, the shapes of the inner and outer surfaces may be different from each other. For example, the outer surface 52 of the bushing 50 may be rectangular in shape, or different from the inner surface shape. Moreover, the inner cylindrical surface may be arcuate in shape or non-cylindrical. In some embodiments, the bushings may be a variety of materials (e.g. aluminum bronze). The bushings may be a variety of constructions, quantities, sizes, shapes (e.g. cylindrical), and materials and still be within the scope of the invention.

In some implementations, the rack framework 40 may be a variety of constructions. As shown in FIGS. 1-6, the rack framework may be a wire grid or base having interconnected wire structure. The rack framework 40 may be rectangular in shape in some embodiments and is adapted to engage the one or more interior side walls or sides 12d of the oven cavity 12 at the outer periphery 22 or portions thereof. In some embodiments, the wire grid may be a variety of materials (e.g. plated nickel wire). In some implementations, the rack framework 40 may include one or more support rods or structures 60. The support rods 60 may extend in the direction D of travel. In some embodiments as shown, the support rods 60, sliding rod 44, and/or bushings 50 may be spaced from the lateral edges 23 of the outer periphery 22 (e.g. parallel or extending from the front to the rear of the rack framework). A variety of one or more support rods 60 may be used or welded to the rack framework 40 at a variety of locations, directions, lengths, etc. (e.g. welds at the opposing ends of the support rod).

In various embodiments, the rack framework 40 may include one or more sliding rods or structure 44. The sliding rods 44 may be cylindrical in shape. Each sliding rod 44 may include an outer cylindrical surface 44a slidably engaging one or more cylindrical bushings 50, 150 or inner cylindrical surfaces 54. The sliding rods 44 and the support rods 60 may be positioned adjacent to each other. Although the sliding rods 44 and support rods 60 are shown as parallel in the figures, the rods may be transverse to each other in some embodiments. The sliding rods 44 and/or the support rods 60 may extend in the longitudinal direction D of travel of the extending rack 20 in some embodiments. The sliding rods 44 may be secured to a variety of structures of the rack framework 40. As shown in the figures in one embodiment, the sliding rods 44 may be secured to the one or more support rods 60 by a variety of fasteners or methods. The sliding rods 44 may be stacked or positioned above the support rods 60 in some embodiments (e.g. in a vertical plane). The opposing ends of the sliding rods 44 may be secured to corresponding ends of the one or more support rods 60. For example, as shown more clearly in FIG. 2, the sliding rod 44 may be secured to the support rod 60 at the rear of the extending rack 20 with screws 62, clevis pins, or other types of fastening mechanisms. Moreover, in some embodiments, the support rod 60 may include a welded clip 64 or be secured by other types of fastening mechanisms at the front of the extending rack 20. The welded clip 64 may engage/receive the other end of the sliding rod 44. Although the welded clip 64 may function as a stop for the wire rack 30 in the direction of travel or forward travel out of the cavity, a variety of one or more stopping structures may be used to limited the travel and/or positions of the wire rack. The stopping structures, if used, may be a variety of constructions, quantities, shapes, sizes, and positions with the extending rack and still be within the scope of the invention.

In some implementations, the extending rack 20 may include one or more retaining clips 70 to secure the one or more cylindrical bushings 50, 150 to the wire rack 30. The retaining clip 70 and one or more bushings 50, 150 may include a pin and slot engagement 75. In some embodiments, the retaining clip may include the slot(s) 76 and the bushing 50 may include the one or more outwardly projecting pins 56. The retaining clip 70 may secure the one or more bushings 50 below the wire rack 30. The elongated cylindrical bushing 50 may extend longitudinally within the retaining clip 70 in the direction D of travel. The retaining clip 70 may be welded to the wire rack 30. The one or more bushings and/or retaining clips may be positioned in a variety of locations relative to the extending rack 20, rack framework 40, and/or wire rack 30. As shown in the one embodiments, the retaining clip 70 and bushings 50, 150 may be recessed from the upper planar support surface of the wire rack 30.

In some embodiments, the one or more bushings 50 may include one or more grooves 58 contouring to the surfaces of the adjacent support rods 60 and/or grid wire of the wire rack 30. As shown in FIG. 4, the grooves 58, if used may receive (e.g. slidingly, fixed, etc.) the support rod 60 and/or wire rack 30.

In various embodiments, one or more cylindrical bushings 50 may slidingly engage a single sliding rod 44 as shown in FIGS. 1-5. The cylindrical bushings 50 may be axially aligned along the sliding rod 44. In some embodiments, the front and rear bushings 50 may be in contact with each other or in a spaced apart relation as shown more clearly in FIG. 5. In other embodiments, a single cylindrical bushing 150 may engage a single sliding rod 44 as shown in FIG. 6.

In use, in some embodiments, the rack framework 40 may be made from bent or formed low carbon steel wire. The wires within the rack framework may be welded into place across the width of the rack framework. The one or more support rods 60 may be welded into place from the front to the back of the rack framework 40. If used, the clip 64 may be welded to the support rod 60 to receive the sliding rod 44 that the one or more cylindrical bushings 50, 150 (e.g. made from an aluminum bronze) will slide or ride upon. The wire rack 30 may be bent/formed wires that may have reinforcement wires welded into place. The retaining clip 70, if used, may be welded onto the one of the wires of the wire rack 30. The cylindrical bushing 50, 150 (e.g. slotted or un-slotted) may have pins 56, if used, cast into the outer cylindrical surface 52 or body and engage the one or more opposing slots 76, if used, of the retaining clip 70. The rack framework 40, wire rack 30, and sliding rods 44 may be nickel plated after which the one or more cylindrical bushings 50, 150 may be assembled into the retaining clips 70. The sliding rods 44 may be inserted into the one or more cylindrical bushings 50, 150 and engaged to the welded clip 64 at the front end of the support rod 60. The sliding rod 44 and support rod 60 will be connected at the back of the extending rack with a fastener such as with screws 62, clevis pins, etc. The quantity of sliding rods 44 and bushings 50, 150 may increase to support a larger load on the wire rack.

It should be understood to one of ordinary skill that the extending rack 20 may be operated by methods in addition to or instead of manually operated. Moreover, a drive mechanism may operate the extending rack towards the deployed position and/or the stowed position, and a variety of positions therebetween.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. An extending oven rack for a cooking appliance comprising:
    a rack framework adapted to engage one or more interior side walls of a cooking appliance;
    one or more cylindrical sliding rods coupled to the rack framework extending in a longitudinal direction of travel of the extending rack, and wherein the one or more cylindrical sliding rods includes an outer cylindrical surface; and
    a wire rack having one or more cylindrical bushings slidingly engaging the one more cylindrical sliding rods in order to position the wire rack forwards and backwards along the longitudinal direction of travel relative to the rack framework, wherein the one or more cylindrical bushings includes an outer cylindrical surface and an inner cylindrical surface, and wherein the inner cylindrical surface of the one or more cylindrical bushings slidingly engages the outer cylindrical surface of the one or more cylindrical sliding rods.

2. The extending oven rack of claim 1 wherein at least two cylindrical bushings of the one or more cylindrical bushings slidingly engage a single cylindrical sliding rod of the one or more cylindrical sliding rods.

3. The extending oven rack of claim 1 further comprising one or more retaining clips securing the one or more cylindrical bushings to the wire rack.

4. The extending oven rack of claim 3 further comprising a pin and slot engagement between the one or more retaining clips and the one or more bushings.

5. The extending oven rack of claim 1 wherein the one or more cylindrical bushings further include one or more longitudinally extending slots, wherein the one or more longitudinally extending slots includes a bottom and opposing sides extending from the bottom to the outer cylindrical surface of the one or more cylindrical bushings, and the inner cylindrical surface of the one or more cylindrical bushings defines the bottom of the one or more longitudinal slots.

6. The extending oven rack of claim 1 wherein a single cylindrical bushing of the one or more cylindrical bushings slidingly engages a single cylindrical sliding rod of the one or more cylindrical sliding rods.

7. The extending oven rack of claim 1 wherein the rack framework includes one or more support rods extending in the longitudinal direction of travel, wherein the one or more support rods are adjacent the one or more sliding rods.

8. An extending oven rack for a cooking appliance comprising:
    an oven cavity having one or more interior side walls;
    a rack framework adapted to engage one or more interior side walls, wherein the rack framework includes a rectangular shaped wire grid and one or more support rods adjacent to one or more cylindrical sliding rods, wherein both the one or more support rods and the one or more cylindrical sliding rods extend in a longitudinal direction of travel of the extending oven rack;
    wherein the one or more cylindrical sliding rods includes an outer cylindrical surface; and
    a wire rack having one or more cylindrical bushings slidingly engaging the one more cylindrical sliding rods in order to position the wire rack forwards and backwards along the longitudinal direction of travel relative to the rack framework, wherein the one or more cylindrical bushings includes an outer cylindrical surface and an inner cylindrical surface, and wherein the inner cylindrical surface of the one or more cylindrical bushings slidingly engages the outer cylindrical surface of the one or more cylindrical sliding rods.

9. The extending oven rack of claim 8 wherein the one or more cylindrical bushings includes a first bushing and a second bushing.

10. The extending oven rack of claim 9 wherein at least one of the first bushing and the second bushing engage a single cylindrical sliding rod of the one or more cylindrical sliding rods.

11. The extending oven rack of claim 9 wherein each one of the first bushing and the second bushing includes a longitudinally extending slot receiving the one or more cylindrical sliding rods.

12. The extending oven rack of claim 11 wherein the longitudinally extending slot of the first bushing is circumferentially unaligned with the longitudinally extending slot of the second bushing.

13. The extending oven rack of claim 9 further comprising a retaining clip, wherein the retaining clip engages the wire rack to at least one of the first bushing and the second bushing.

14. The extending oven rack of claim 8 wherein opposing ends of the one or more cylindrical sliding rods are secured to corresponding opposing ends of the one or more support rods, and wherein the one or more sliding rods are positioned above the one or more support rods in a substantially vertical plane.

15. An extending oven rack used in a cooking appliance comprising:
   a rack framework including a rectangular shaped wire grid and a support rod adjacent to a cylindrical sliding rod, wherein both the support rods and the cylindrical sliding rod extends in a longitudinal direction of travel of the extending oven rack;
   wherein the cylindrical sliding rod includes an outer cylindrical surface; and
   a wire rack having a retaining clip positioning a first cylindrical bushing, wherein the first cylindrical bushing slidingly engages the cylindrical sliding rod in order to position the wire rack forwards and backwards along the longitudinal direction of travel relative to the rack framework, wherein the first cylindrical bushing includes an outer cylindrical surface and an inner cylindrical surface, and wherein the inner cylindrical surface of the first cylindrical bushing slidingly engages the outer cylindrical surface of the cylindrical sliding rod.

16. The extending oven rack of claim 15 further comprising a second cylindrical bushing slidingly engaging the cylindrical sliding rod.

17. The extending oven rack of claim 16 wherein the second cylindrical bushing and the first cylindrical bushing are axially aligned.

18. The extending oven rack of claim 15 wherein the first cylindrical bushing includes a longitudinal slot within the outer cylindrical surface of the first cylindrical bushing.

19. The extending oven rack of claim 15 wherein the first cylindrical bushing and the cylindrical sliding rod is spaced inwardly from a lateral edge of the rack framework.

20. The extending oven rack of claim 15 wherein the support rod and the cylindrical sliding rod are stacked in a vertical plane.

* * * * *